July 7, 1959 — A. G. SWANSON — 2,893,577
LIFTING DEVICE
Filed April 16, 1956 — 2 Sheets-Sheet 1
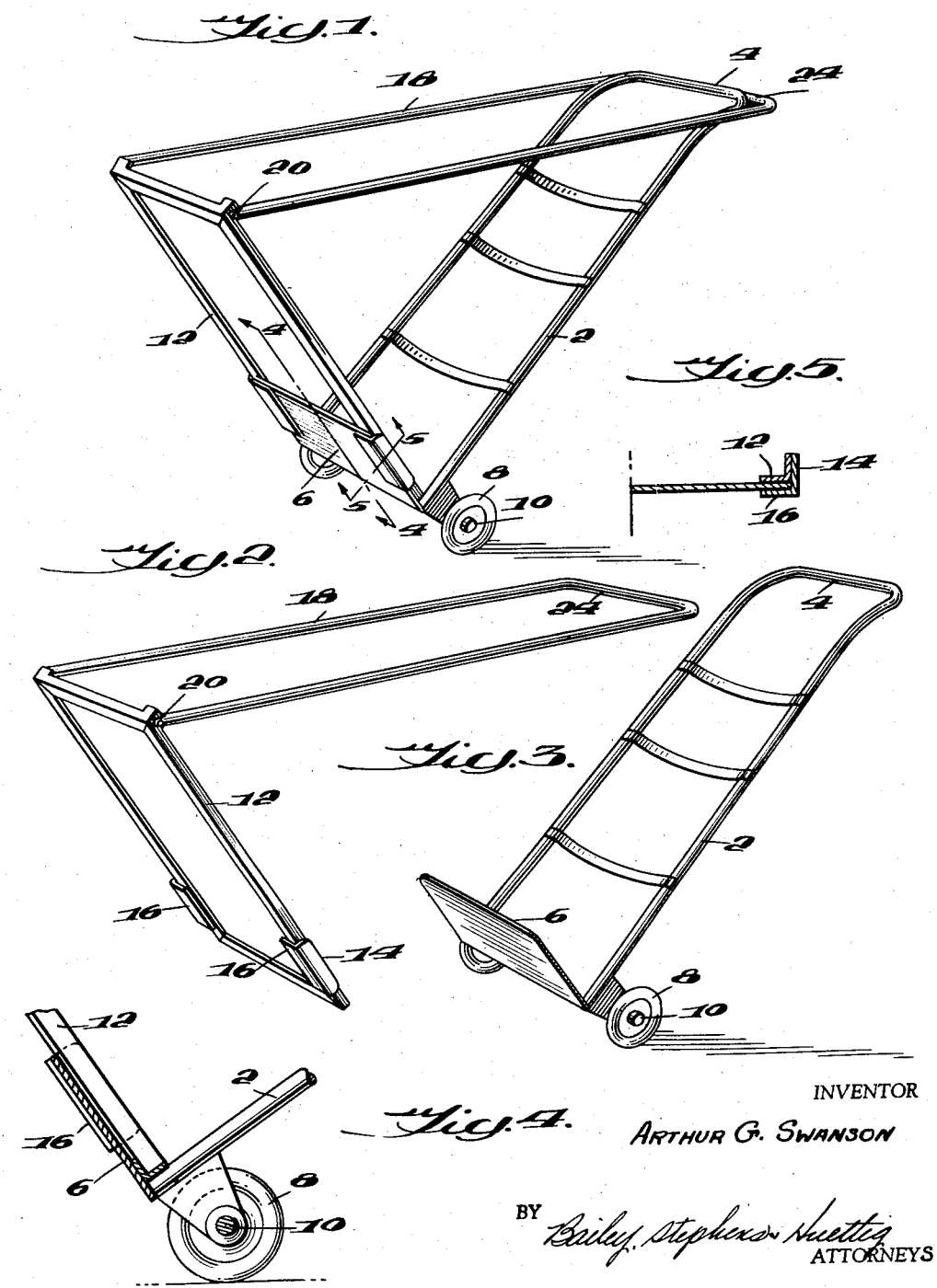
INVENTOR
ARTHUR G. SWANSON
BY
ATTORNEYS July 7, 1959  A. G. SWANSON  2,893,577
LIFTING DEVICE
Filed April 16, 1956  2 Sheets-Sheet 2

INVENTOR
ARTHUR G. SWANSON
BY
ATTORNEYS

United States Patent Office 2,893,577  
Patented July 7, 1959

2,893,577

LIFTING DEVICE

Arthur G. Swanson, Valparaiso, Ind.

Application April 16, 1956, Serial No. 578,238

2 Claims. (Cl. 214—372)

This invention relates to a lifting device. In particular, it is directed to a device in which a hand truck is employed as a lifting device.

The object of the invention is to produce an attachment for a hand truck so that the truck can be used to lift vertically such objects as tables, without tilting the object to any appreciable degree.

In general, this and other objects are obtained by providing an extension from the toe plate of a hand truck, and hinging a lifting lever frame to the end of the extension. The free end of the lever frame is adjacent the handle portion of the raised truck. By dropping the lever frame, the hand truck with attached frame can be wheeled to a position beneath a table; then by rotating the hand truck on the axle for its wheels, the extension can be tilted upwardly to engage beneath the table top. The lever frame can then be raised to engage beneath the table top, and then by both further tilting the extension and raising the lever frame, the table can be lifted vertically upward without being canted. The hand truck can then be moved to convey the table to any other desired position. Thus this simple frame gives an additional function to a hand truck, and enables the moving of tables having articles thereon, without the danger of the articles slipping off during transit.

The means by which the objects of the invention are obtained are described more fully with reference to the accompanying drawings, in which:

Figure 1 is a perspective view of a hand truck with the lifting frame attached thereto;

Figure 2 is a perspective view of the lifting frame separated from the hand truck;

Figure 3 is a perspective view of the hand truck by itself;

Figure 4 is a cross-sectional view on the line 4—4 of Figure 1;

Figure 5 is a cross-sectional view on the line 5—5 of Figure 1;

Figure 6:
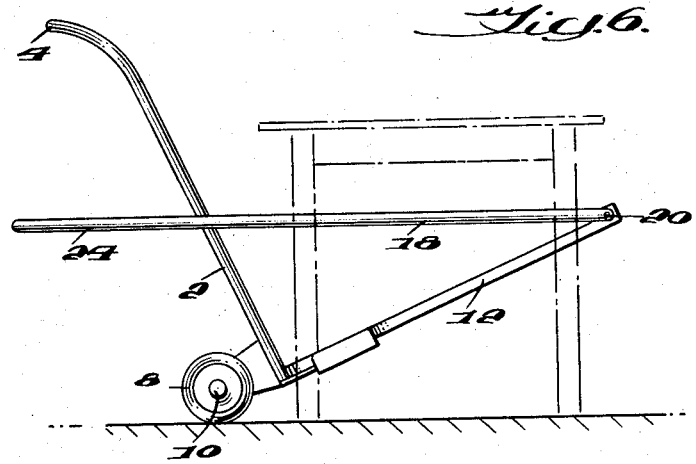
Figure 6 is a diagrammatic view showing the lifting device being moved into position beneath a table.

An ordinary hand truck is used which has a bed frame 2 with an upper handle portion 4. A toe plate 6 is secured to the lower edge of the bed frame 2 generally at right angles thereto. The hand truck rides on wheels 8 mounted on axles 10.

The lifting attachment is composed of a rectangular extension frame 12. Adacent the lower edges of frame 12, are secured angle members having one flange 14 attached to frame 12, with the other flange 16 extending across and spaced from frame 12. This forms a slot for receiving the side edges of toe plate 6.

A U-shaped lifting lever frame 18 has the free ends of its legs secured by pivots or hinges 20 to the upper end of extension frame 12. The other end 24 of frame 18 extends over handle portion 4, closely adjacent thereto so that when the palms of the hands of the user of the hand truck rest on handle portion 4, the fingers can grasp and move end 24.

Figure 7:
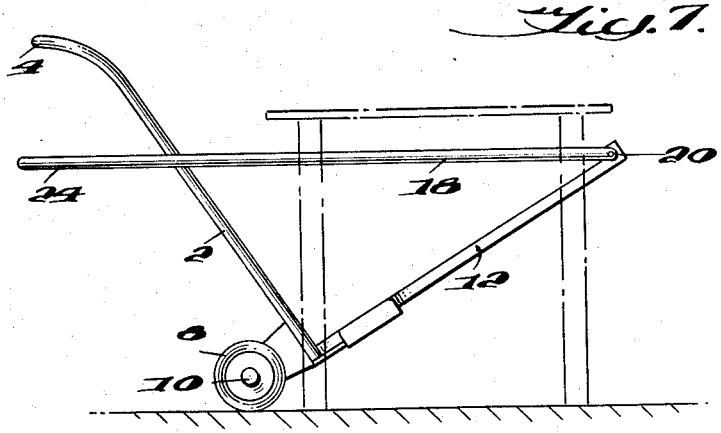
Figure 7 is a similar view showing the lifting device in position for lifting.
Figure 8:
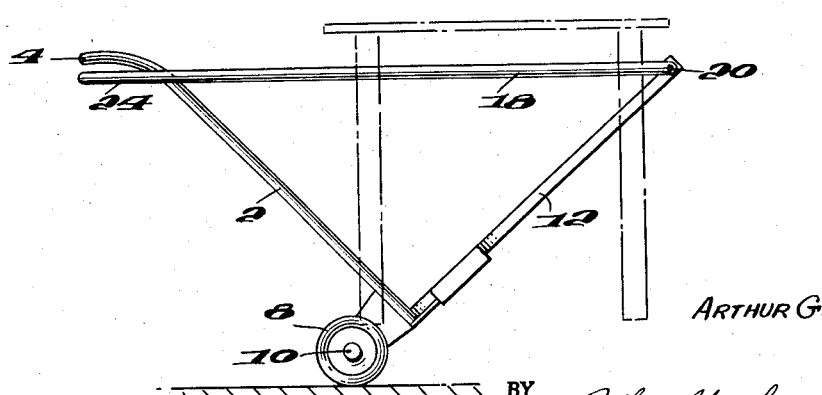
Figure 8 is a similar view showing the lifted table.

After the device has been assembled by slipping toe plate 6 in between flanges 16 and frame 12, the device is operated as diagrammatically illustrated in Figures 6 to 8. In the beginning, end 24 is lowered, and toe plate 6 and extension 12 tilted downwardly so that the hand truck can be pushed beneath a table. Then, as shown in Figure 2, extension frame is tilted upwardly by rocking the hand truck on its axle 10, and frame 18 is raised by lifting end 24 to swing frame 18 on hinge 20 and brought into contact with the undersurface of the table. Thereupon, handle 4 is further depressed raising the upper end of extension 12, the hand truck being further rocked on its axle 10. At the same time, end 24 is lifted by pulling it up with the user's fingers as the palms are used to press handle portion 4 downward. This causes frame 18 to rise vertically while staying substantially horizontal and lifting the table from the floor. The hand truck can then be moved on wheels 8 to carry the table to any other place.

The lifting device has the advantage that a table with any articles on the table, such as dishes and other eating utensils, or chairs stacked on top of a table, can be quickly moved about a room without spilling what is on the table. This is particularly useful in restaurants when it is desired to clear temporarily certain areas. When not in use, the lifting frame can be quickly detached from the hand truck and collapsed to a flat position for storage. The device gives additional utility to an ordinary hand truck. Although the device has been described for lifting a table, it can be used for the lifting of other articles.

Having now described the means by which the objects of the invention are obtained,

I claim:

1. A table lifting device comprising a hand truck having a bed frame with a handle end and a toe plate mounted on the lower end of said bed frame at substantially a right angle thereto, an extension frame secured to said toe plate and projecting therefrom at substantially the same angle to said bed frame, and a lever frame hinged at one end to said extension frame with the free end of said lever frame swingable over said handle end and movable with respect to said handle end to be kept in a horizontal plane as said hand truck is tilted.

2. A table lifting device as in claim 1, said extension frame being detachably secured to said toe plate.

References Cited in the file of this patent

UNITED STATES PATENTS

| | | |
|---|---|---|
| 1,405,293 | Corlett | Jan. 31, 1922 |
| 2,374,982 | Davies | May 1, 1945 |
| 2,681,740 | Schueler | June 22, 1954 |
| 2,711,260 | Butler | June 21, 1955 |
| 2,715,031 | Danielsson | Aug. 9, 1955 |